United States Patent

[11] 3,549,813

[72] Inventors Ullrich Tanke
Grafelfing;
Dieter Voegtlen, Starnberg; Fritz Brandt;
Karl Bruninghaus, Munich, Germany
[21] Appl. No. 627,147
[22] Filed Mar. 30, 1967
[45] Patented Dec. 22, 1970
[73] Assignee Siemens Aktiengesellschaft
Munich, Germany
[32] Priority Mar. 31, 1966
[33] Germany
[31] No. S102,965

[54] SYSTEM AND PROCESS FOR SUPERVISION OF SIGNAL LINES
15 Claims, 7 Drawing Figs.

[52] U.S. Cl. .......... 179/18, 307/88
[51] Int. Cl. .......... H04q 3/42
[50] Field of Search .......... 179/18.7Y, 18.7YA, 18BT; 307/88, (Cursory)

[56] References Cited
UNITED STATES PATENTS
3,238,306 3/1966 Bohlmeider .......... 179/18(BT)
3,415,955 12/1968 Singer .......... 179/18(.7YA)

*Primary Examiner*—Kathleen H. Claffy
*Assistant Examiner*—William A. Helvestine
*Attorney*—Birch, Swindler, McKie & Beckett

ABSTRACT: A supervisory control system and process, wherein supervisory and evaluation circuits are employed to determine the states of a plurality of signal lines. Depending upon connections effected in a signal line, specific signals are present therein, and these signals are evaluated to determine the state of the signal line. Inquiry elements are operatively associated with the signal lines and are selectively connected to the supervisory and evaluation circuits to provide a scanning process for successive evaluation of the signal lines. Ferromagnetic or ferroelectric inquiry elements may be utilized, which are connectable to the signal lines and are responsive to the signals therein, to provide supervisory output signals that are evaluated to determine the state of the associated signal line.

SYSTEM AND PROCESS FOR SUPERVISION OF SIGNAL LINES

BACKGROUND OF THE INVENTION

1. Field of the Invention

The invention relates to supervisory questioning of signal lines, to determine the existing state of the line. Thus, depending upon which one of a plurality of possible connections is completed in the signal line being questioned, a specific current will flow in the signal line. An inquiry element is associated with each signal line, and depending upon how the inquiry element is effected by the signals present therein, the supervisory and evaluation apparatus can determine the particular state of the signal line. The invention has particular use in telephone installations wherein a plurality of lines must be constantly checked to determine the state thereof.

2. Description of the Prior Art

The prior art discloses the utilization of ferromagnetic or ferroelectric elements connected to long distance communication lines, that are actuable between bistable states, depending upon whether the line being tested is open or closed. The ferromagnetic or ferroelectric inquiry elements comprise input means periodically fed with scanning pulses. Depending upon the state of the communication line, the associated inquiry element assumes one of the bistable states. A change between bistable states causes the ferromagnetic or ferroelectric means to generate supervisory control pulses in associated output means, that may be evaluated to determine the condition or state of the line being tested. If the state of the line being tested changes rapidly, the scanning process can be repeated at a rate sufficient to ensure correct indication of the state of the communication line.

Therefore, it is seen that a determination can be made as to whether the long distant communication line is free or busy, depending upon whether or not a current is flowing therein. Further, these types of inquiry elements may also be utilized to provide an indication of the particular signal pulses being transmitted over a signal line. However, this requires that the signal line be scanned at least once during the duration of the shortest signal pulse, or the shortest time interval between two successive signal pulses. To preclude multiple counting of an individual signal pulse, the actual registration criteria is ascertained according to the "last-look principle." According to this principle, each inquiry result is registered intermediately for the duration of an individual inquiry cycle in a register, and is then compared to the successive inquiry result. Since the transition from the signal-absent state to the signal-present state, as well as the transition from the signal-present state to the signal-absent state is characteristic for each signal pulse, the registration of a signal pulse may be effected only when such a transition is evaluated.

However, the inquiry element is thereby limited in its recognition capability, since it recognizes only the existence or nonexistence of a signal pulse at a certain time. It cannot differentiate between the existence of a plurality of possible signals, any one of which may be transmitted by the signal line at a particular time.

SUMMARY OF THE INVENTION

These and other objections and defects of the prior art are solved by the present invention. A plurality of inquiry elements, which comprise either ferromagnetic or ferroelectric elements, are interconnected in a matrix. Each individual inquiry element is associated with a particular communication line, and its magnetic or electric state depending upon whether it is a ferromagnetic or a ferroelectric element, respectively) is initially determined by the signals flowing in the communication line. Inquiry signals are fed to the inquiry element, and the changes in state effected in the inquiry element thereby develop supervisory signals indicative of the signals flowing in the communication line.

The inquiry signals may comprise time spaced pulses of equal amplitude but opposite polarity, or of the same polarity and different amplitudes. Alternatively, the inquiry signals may comprise a stepped wave or a sawtooth wave signal. Depending upon the initial state of the inquiry element which is determined by the condition of the communication line, the inquiry element will respond to the inquiry signals in a particular manner. For example, if ferromagnetic inquiry elements are utilized, its input winding is connected in the communication line. The inquiry pulses are then fed to a control winding of the inquiry element, and the supervisory signals are induced in an output winding of the inquiry element in response thereto, which are indicative of the signals flowing in the communication line.

The communication line may be in one of several states. For example, it may comprise parallel circuits, each having an individual series connected switch. Depending upon whether both switches are open, or a selected one of the switches is closed, the communication line will have certain currents flowing therein, which are fed to the input winding of the inquiry element. This will cause the inquiry element to assume a particular magnetization state, and changes in the magnetization state effected by the inquiry signals are then evaluated to indicate the state of the communication line, and particularly which, if any, switch is closed. The utilization of a stepped or sawtooth wave inquiry signal, and its connection to the inquiry element being questioned such as to develop a net magnetic field of zero intensity in response thereto, serves to provide a convenient standard reference to provide a relatively fast evaluation of the state of the communication line associated therewith.

When the state of the particular communication line being tested has been evaluated and indicated, the control apparatus successively connects the supervisory and evaluation circuits to another inquiry element. Thus, a plurality of inquiry elements are successively questioned in a relatively short period of time, and may be continuously supervised.

DETAILED DESCRIPTION OF THE INVENTION

Figure 1:
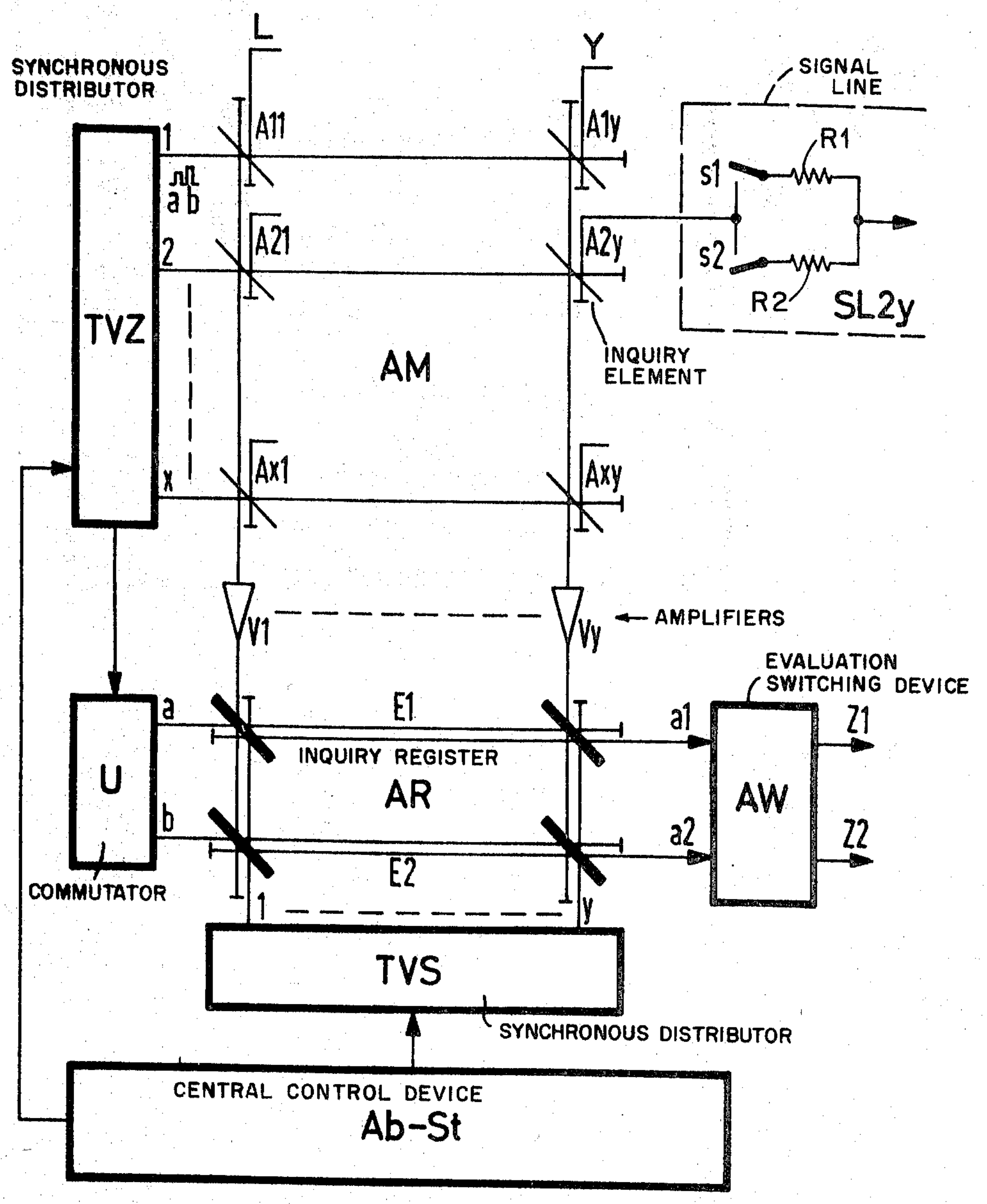
FIG. 1 is a schematic diagram of the electrical control apparatus which connects the supervisory and evaluation circuits to the matrix comprising the inquiry elements.

FIG. 1 shows signal line SL2*y*, that is supervised by inquiry element A2*y*. A plurality of inquiry elements A11, A21....A*x*, and A1*y*, A2*y*....A*xy*,are arranged in column connection lines L and Y, respectively, and in row connection lines 1, 2...*x*, to form matrix AM. Each of the inquiry elements is connected to its associated signal line, through a control winding (not illustrated). For purposes of simplicity, only signal line SL2*y* is illustrated. The individual inquiry elements, for example, A11 and A1*y* comprising a row of inquiry elements, are questioned simultaneously. Further, successive rows are cyclically questioned, to provide substantially continuous supervision.

The inquiry elements may comprise conventional fer-romagentic or ferroelectric elements that are switchable between bistable states of operation in response to current variations applied thereto. The invention will be described with reference to a ferromagnetic inquiry element.

Synchronous distributor TVZ successively feeds time spaced input pulses *a* and *b* to the input windings (not shown) of the associated inquiry elements of each row connection line. Depending upon the initial magnetization state of the ferromagnetic inquiry element, output signals are induced in the output windings thereof (not shown), and are fed over connection column lines L and Y to inquiry register AR. The output signals of the inquiry elements associated with the L column connection line are amplified by amplifier V1, and that output signals of the inquiry elements associated with the column Y connection line are amplified by amplifier V*y*.

Inquiry register AR comprises first and second inquiry register elements, E1 and E2 which are successively activated by commutator U to register the response of the inquiry element being questioned to inquiry pluses *a* and *b*, respectively. Commutator U thus feeds pulses *a* and *b* to inquiry registers E1 and E2, to effect synchronous registration therein of the signals induced in the output winding of the inquiry element being questioned in response to input pulses *a* and *b*, respectively. Thus, the states of the individual inquiry elements associated with a row connection line are registered in inquiry register AR. The synchronous distributor TVS, successively distributes the registered output signals of the individual inquiry elements comprising each row connection line, to evaluation switching device AW. Inquiry element output signals developed as a result of impulse *a* are transmitted over output line *a*1 of inquiry register element E1 to evaluation switching device AW. Further, the inquiry element output signals produced as a result of impulse *b*, are transmitted from inquiry register element E2 to evaluation switching device AW over line *a*2. The evaluation switching device AW evaluates the state of the individual inquiry element being questioned by evaluating the output signals *a*1 and *a*2 of inquiry register AR, and develops indication signals Z1 and Z2, indicative of the condition or state of switches *s*1 and *s*2 of the individual signal lines such as SL2*y*.

Central control device A*b*-S*t* synchronously controls synchronous distributors TVZ and TVS to respectively successively feed input control signals *a* and *b* in sequential manner to the row connection lines, and successively feed the output signals of the inquiry elements of column connection lines L and Y to evaluation switching device AW, to thereby develop an information signal series at outputs Z1 and Z2 indicative of the conditions or states of the inquiry elements.

The individual inquiry elements A11 through A*xy* may comprise either ferromagnetic or ferroelectric elements, with or without energy storage properties, but with distinct saturation characteristics.

Figure 2:
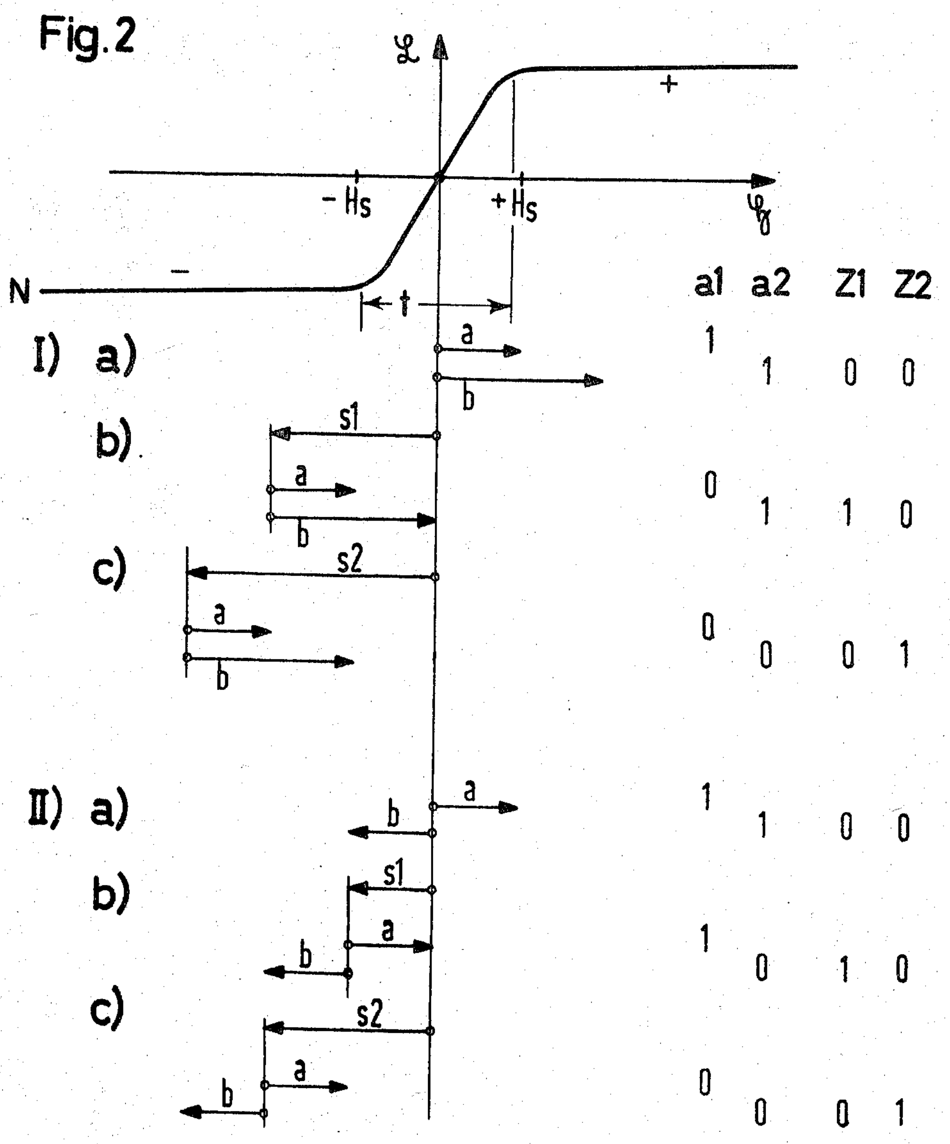
FIG. 2 shows a magnetization curve of a ferromagnetic material having no hysteresis loop or magnetic energy storage properties, and the magnetization states thereof when time spaced inquiry pulses of different amplitudes but of the same polarity are applied thereto, (example I), and when time spaced inquiry pulses of the same amplitude, but of opposite polarity are allied thereto (example II)

FIG. 2 shows an illustrative hysteresis curve of a ferromagnetic inquiry element, without magnetic energy storage characteristics or hysteresis loop loss. Hence, there is in effect no hysteresis loop, and the magnetization curve passes through the zero coordinates of the magnetic field intensity and magnetic flux density coordinates. Example I is illustrative of an embodiment of the invention wherein impulses *a* and *b* are of the same polarity, but of different amplitude. Thus graph *a* illustrates the relative amplitudes of current pulses *a* and *b* and particularly, their effect on the magnetization of an inquiry element when applied to the control winding thereof. It is seen that pulses *a* and *b* will polarize the inquiry element positively, for example, but to different magnetic strengths.

Assume that switch *s*1 of signal line SL2*y* is closed, thereby feeding a current to the input winding of inquiry element A2*y*. which negatively magnetically polarizes said element as shown in I*b*. Then, pulse *a* is of insufficient amplitude to develop an associated magnetic field to remagnetize the inquiry element through transition range *t* wherein the magnetic flux density variation is greatest. Therefore, the inquiry element will remain in the negative saturation range.

Further, the hysteresis curve illustrated in FIG. 2, comprises positive and negative saturation ranges wherein relatively large variations in the magnetic field, produce correspondingly slight variations in the magnetic flux density. Therefore, to magnetically repolarize the ferromagnetic material having this type of hysteresis curve, between the two saturated ranges, it is necessary to feed a current to the control winding of the inquiry element to produce a magnetic field of intensity greater than the saturation field force $-H_S$ or $+H_S$, depending upon the change that is to occur.

Each inquiry element comprises an output winding in which currents are induced in response to changes in the magnetic flux density of the ferromagnetic element, that are indicative of the magnetic flux change. Therefore, the induced current is greatest when the ferromagentic inquiry element is remagnetized from one saturation range to the other, during which time the magnetic flux density variation passes through transition zone *t*. Further, the induced currents are correspondingly of low amplitude when the magnetic field intensity varies within either of the two saturation ranges. Therefore, by differentiating the change in the induced currents resulting from variations in the magnetic flux density of the ferromagnetic inquiry element, the type of variation occurring as a result of applying input impulses *a* and *b* can be evaluated, to determine the state of the associated signal line.

Graph *a* of Example I illustrates the relative magnetic fields produced by input impulses *a* and *b*, when switches *s*1 and *s*2 are open (no current in signal line SL2*y*). Under these conditions, a high amplitude pulse is produced in the output winding of inquiry element A2*y*, when the control winding thereof is energized by pulses *a* and *b*.

As illustrated in Example I*b*, input impulses *a* and *b* are time spaced. Therefore, at the end of impulse *a*, inquiry element A2*y* returns to its initial magnetic condition of zero magnetic field intensity, and zero magnetic flux density (because there is no magnetic storage, as illustrated in example 2) and upon the application of input pulse *b* is again driven to the positive saturation range, consequently inducing a high amplitude current in the output winding of inquiry element A2*y*. Commutator U synchronously connects the inquiry element to register E1 when pulse *a* is applied to the inquiry element, and to register element E2 when impulse *b* is applied to the inquiry element. Therefore, when pulses *a* and *b* are applied under these conditions, a binary 1 output is produced by register elements E1 and E2. The scanning of the inquiry register AR, as determined by synchronization distributor TVS, produces a binary 1 output at lines *a*1 and *a*2 which are fed to evaluator AW. Binary 1 inputs to evaluator AW are evaluated thereby and function to produce binary 0 outputs to output lines Z1 and Z2. This is indicative of the currentless state of the questioned signal line SL2*y*, that is, if Z1 and Z2 simultaneously comprise binary 0 outputs, this is indicative of the fact that both switches *s*1 and *s*2 are open. This result is illustrated in the graphs associated with Example I*a* of FIG. 2.

Example I*b* of FIG. 2, illustrates the effect of energizing signal line SL2*y* by closing switch *s*1. Closure of switch *s*1 completes the circuit including the input winding of inquiry element A2*y* and signal line SL2*y* and the associated electronic circuitry (not illustrated) and thereby energizes the input winding of inquiry element A2*y* to produce a negatively polarized magnetic field to magnetize the inquiry element to the negative saturation range illustrated in Example I*b*. Input impulse *a* then is not sufficient to remagnetize the inquiry element into transition zone *t*.Thus, the slight change in magnetic flux density which occurs as a result of the application of input impulse *a*, provides a relatively slight current to be induced in the output winding thereof, resulting in register element E1 delivering a binary 0 output over associated line *a*1 to evaluator AW.

However, input impulse *b* is of sufficient magnitude, to develop a magnetic field of opposite polarity to the magnetic field resulting from closure of switch *s*1 and to drive inquiry element A2*y* into transition zone *t*. This functions to induce a relatively high amplitude current in the output winding of inquiry element A2*y* to register element E2, which consequently feeds a binary 1 output over line *a*2 to evaluator AW. Evaluator AW functions to produce an output of Z1 equal to binary 1, and Z2 equal to binary 0, when inputs *a*1 and *a*2 thereof, respectively, equal binary 0 and binary 1. This is indicative of the fact that switch *s*2 is closed.

Assume that switch *s*2 of signal line SL2*y* is closed. Then, the circuit comprising inquiry element A2*y* and signal line SL2*y* is completed through switch *s*2 and resistor R2 and the associated electrical circuitry (not illustrated). The current existing in the circuit described, is sufficient to drive inquiry element A2*y* further into the negative saturation range relative to closure of switch *s*1. This illustrated in Example I*c* of FIG. 2. Then, input impulses *a* and *b*, are both of insufficient amplitude to drive the inquiry element into transition zone *t*. Therefore, register elements E1 and E2 will be provided with relatively low amplitude inputs from inquiry element A2*y* when input impulses *a* and *b* are respectively applied thereto, and will feed binary 0 outputs over lines *a*1 and *a*2 to evaluator AW. Under these conditions, evaluator AW will produce binary 0 and binary 1 outputs at Z1 and Z2 respectively, which is indicative that *s*2 is closed.

It is therefore seen that depending upon whether switches *s*1 and *s*2 are both open, or one or the other is closed, inquiry element A2*y* will produce distinctive output signals upon the application of impulses *a* and *b*, which are indicative of the condition of the two switches and hence of the signal line. It is also possible for input impulses *a* and *b* to be equal in amplitude, but of opposite polarity. This is illustrated in Example II, with reference to FIG. 2. For example, state *a* of the inquiry element shows the magnetic fields produced by input impulses *a* and *b*, when switches *s*1 and *s*2 are both open. It is seen, that the respective input impulses *a* and *b* are then operative within the transition zone *t*, thereby inducing high amplitude currents in the output winding of inquiry element A2*y* which produce binary 1 outputs from register elements E1 and E2. These are in turn evaluated by evaluator AW, to produce binary 0 outputs at Z1 and Z2, which is indicative of the fact that both switches *s*1 and *s*2 are open.

In Example II*b*, the magnetic state of the inquiry element is illustrated when switch *s*1 is closed, completing the circuit between A2*y* and R1 through switch *s*1, and the associated electrical circuitry not illustrated. Then application of input impulse *a* to the input winding of inquiry element A2*y*, produces a magnetic field of opposite polarity to the magnetic field produced by closure of switch *s*1. Further, the magnetic flux variation resulting from the application of input impulse *a* is operative within transition zone *t*, and thereby produces a relatively high amplitude current to be induced in the output winding of the inquiry element, which functions to produce a binary 1 output from register element E1 at connection line *a*1.

On the other hand, input impulse *b* produces a negative magnetic field which is additive to the negative magnetic field produced by the current flowing in signal line SL2*y* as a result of switch *s*1 being closed, further driving the inquiry element into the negative saturation range when applied thereto. Therefore, it produces a relatively slight amplitude current to be induced in the output winding of the inquiry element, and consequently a binary 0 output is delivered by register element E2 to evaluator AW over connection line *a*2. Evaluator AW, upon application of a binary 1 and a binary 0 input over connections lines *a*1 and *a*2, produces a binary 1 and a binary 0 output at outputs Z1 and Z2, respectively. This is indicative that switch *s*1 is closed.

With reference to Example II*c*, it is seen that closure of switch *s*2, produces a magnetic field which drives inquiry element A2*y* deep into the negative saturation range. Then, although input impulse *a* is of such polarity as to produce a magnetic field of opposite polarity to that produced by closure of switch *s*2, it is insufficient in amplitude to effect a net magnetic field to drive the inquiry element into transition zone *t*. Therefore, a relatively low amplitude current is induced in the output winding of the inquiry element resulting in register element E1 delivering a binary 0 output to evaluator AW over connection line *a*1. 1. Further, input impulse *b* develops a magnetic field which is additive to the negative magnetic field produced by closure of switch *s*2, and drives the inquiry element further into the negative saturation range. Thus, register element E2 feeds a binary 0 output to evaluator AW over connection line *a*2. Evaluator AW, under these conditions, produces a binary 0 and a binary 1 output at output lines Z1 and Z2, respectively, indicative that switch *s*2 is closed.

Figure 3:
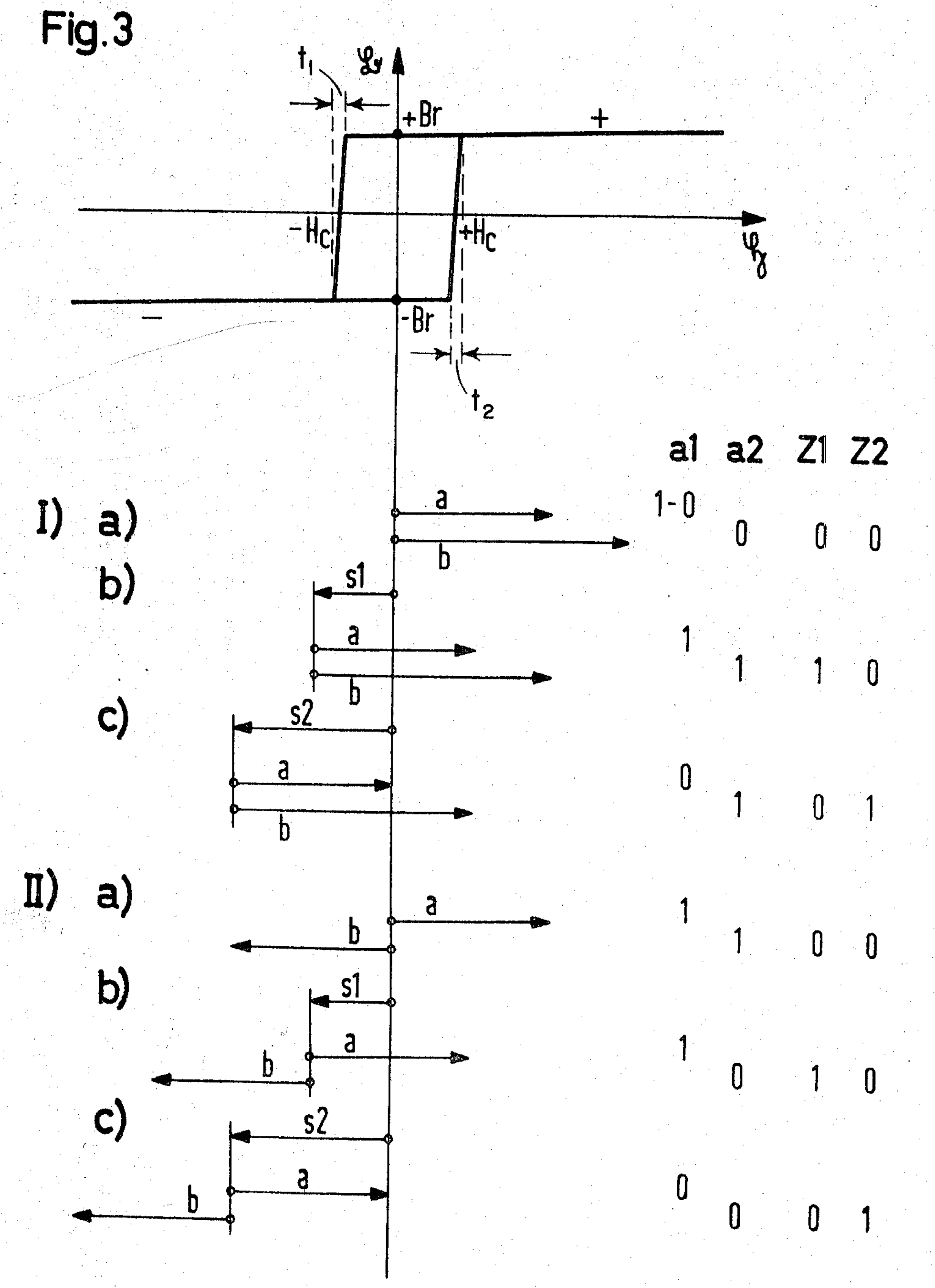
FIG. 3 illustrates a typical hysteresis loop of a ferromagnetic material having an hysteresis loop and magnetic storage energy properties, and the magnetization states thereof when time spaced inquiry pulses of the same plurality but of different amplitudes are applied thereto (example I), and when time spaced inquiry pulses of equal amplitude but of opposite polarity are applied thereto (example II)

FIG. 3 illustrates a typical hysteresis curve or loop of a ferromagnetic inquiry element having magnetic storage and loss properties. Example I thereof, illustrates the relative states of the inquiry element when equally polarized, but different amplitude input impulses *a* and *b* are applied thereto. Example II illustrates the states of the inquiry element when input impulses *a* and *b* are of equal amplitude, but of opposite polarity.

In contrast to the inquiry element having a magnetization curve illustrated in FIG. 2, wherein there is no hysteresis loss and wherein there is no magnetic energy storage, the hysteresis loop illustrated in FIG. 3 shows two transition ranges between the two saturation ranges, in which transition ranges the magnetic flux variation or change is relatively great. These are designated zones $t_1$ and $t_2$, respectively, occurring between remagnetization of the inquiry element from negative to positive polarization, and from positive to negative polarization. Further, bistable remanent magnetic states of positive and negative remanent magnetization +BR and −BR, respectively, exist. As is known, the magnetization of a magnetic inquiry element between the bistable states necessitates the supply of magnetic power of such intensity to exceed the coercive force $+H_c$ or $-H_c$ by a certain amount, depending upon the shape of the hysteresis loop, and which decreases as the hysteresis loop approaches a rectangular shape.

In FIG. 3, three individual states of switches *s*1 and *s*2 can be distinguished. These are whether both switches *s*1 and *s*2 are closed, or either of switches *s*1 and *s*2 is closed. For example, assume that input impulses *a* and *b* produce corresponding magnetic fields of the same polarity, but of different amplitudes. Further, assume that the inquiry element A2*y* is initially positively remanently magnetically polarized to +BR. Then, input impulses *a* and *b*, produce no polarization change since they produce magnetic fields of the same polarity as the initial remanent magnetic state. They produce magnetic fields that drive inquiry element A2y deeper into the positive saturation range, thereby producing a relatively low amplitude current to be induced in the output winding of the inquiry element, since the flux variation in the saturation range is slight. Therefore, register elements E1 and E2 will respectively produce binary 0 outputs at connection lines *a*1 and *a*2. Associated evaluator AW, consequently produces binary 0 outputs at Z1 and Z2, indicative of the fact that switches *s*1 and *s*2 are both open.

However, assume that switch *s*1 is closed, resulting in a current to the input winding of the inquiry element such as to produce a magnetic field which drives the inquiry element into the negative saturation range as illustrated in Example II*b*. Under these conditions, the magnetic fields produced by input pulses *a* and *b*, are of sufficient amplitude to effect a change from the negative saturation range to the positive saturation range, through transition zone $t_2$. This will produce binary 1 outputs at *a*1 and *a*2. Evaluator AW will then produce binary 1 and binary 0 outputs at Z1 and Z2, respectively, indicative of the fact that switch *s*1 is closed. It is understood that following termination of input pulse *a*, the current in the input winding resulting from switch s1 being closed returns the inquiry element to the initial negative saturation range, across a transition range $t_1$ of relatively high magnetic flux variation. Commutator U activates register elements E1 and E2, only when input impulses *a* and *b*, respectively, are synchronously produced by synchronous distributor TVZ. Therefore, any magnetic flux variation induced in the output winding of inquiry element A2*y* within transition zone $t_1$, is not registered in register AR, and therefore does not produce an erroneous evaluation by evaluator AW.

Example I*c* of FIG. 3, illustrates the effect of closing switch *s*2. Then, relative to Example I*b*, the inquiry element is initially magnetized even deeper into the negative saturation range. Under these conditions, input impulse *a* is not of sufficient strength to remagnetize the inquiry element to the positive magnetic polarization state, through transition zone $t_2$. However, input impulse *b* is sufficient to effect remagnetization of the inquiry element, since it produces an oppositely polarized magnetic field sufficiently greater in amplitude than the combined effects of the remanent magnetism and the magnetic field produced by the current flowing in the input winding of the inquiry element as a result of closing switch *s*2. Under these conditions, register elements E1, E2, respectively, produce binary 0 and binary 1 outputs at connection lines *a*1 and *a*2. This in turn causes evaluator AW to produce binary 0 and binary 1 outputs at Z1 and Z2, respectively, which is indicative of the fact that switch *s*2 is closed.

However, if it is assumed that the inquiry element A2*y* is initially in the negative remanent magnetic state, —BR, and that switches *s*1 and *s*2 are open, input impulse *a* is of sufficient amplitude to effect remagnetization of the inquiry element to the positive magnetic state, through transition zone $t_2$. This will feed a binary 1 output to register element E1 and cause it to produce a binary 1 output at *1. However, when input impulse b* is applied, the inquiry element will be driven deep into the positive saturation range from the positive remanent magnetic state, resulting in a slight current to be induced in the output winding of inquiry element. This effects a binary 0 output from register element E2 at connection line *a*2. UNder these conditions, evaluator AW produces binary 0 output to lines Z1 and Z2, which is indicative of the fact that switches *s*1 and *s*2 are both open. Therefore, it is seen that when register elements E1 and E2 feed binary 1 and binary 0, or binary 0 and binary 0 outputs, respectively, to the logic circuitry of evaluator AW, binary 0 outputs are produced at output lines Z1 and Z2, respectively. This is indicative that switches *s*1 and *s*2 are open.

It is, therefore, seen that the magnetization intensity effected by input pulse *b* must be greater than the initial magnetization intensity effected by the current resulting from closing switch *s*2 and the negative remanent magnetization of the inquiry element. Likewise, the magnetic field produced by input impulse a must be greater than the initial magnetic field caused by the current resulting from closure of switch *s*1, added to the negative remanent magnetic field of the inquiry element. However, the magnetic field effected by input pulse *a* must be less than the magnetic field effected by the current flowing through the inquiry element as a result of closure of switch *s*2, and the negative remanent magnetic field, —BR.

Analogous conditions exist when input pulses *a* and *b* are of the same amplitude, but of opposite polarity. This is illustrated in Example II*a* of FIG. 3. In the absence of current in signal line SL2*y* (which occurs when switches *s*1 and *s*2 are both open) inquiry element A2*y* is continuously remagnetized between the two stable states of magnetic polarization by oppositely polarized pulses *a* and *b*. Therefore, the transition zones $t_1$ and $t_2$ are crossed, causing register elements E1 and E2 to produce binary 1 outputs at connection lines *a*1 and *a*2, respectively. This in turn is evaluated by evaluator AW', to produce binary 0 outputs at output lines Z1 and Z2, indicative of the currentless state of signal line SL2*y*.

FIG. 3 II*b* illustrates the effect of closing switch *s*1. This produces a current in signal line SL2*y*, which is fed to the input winding of the inquiry element and magnetizes the inquiry element into the negative saturation range. Then, input pulse *a* is of sufficient amplitude to produce a corresponding remagnetization of the inquiry element to the positive magnetic saturation range. Termination of input pulse *a*, effects remagnetization of the inquiry element back to the negative saturation range by the current flowing in signal line SL2*y* and input pulse *b* then drives the inquiry element deeper into the negative saturation range, since it is of a polarity to produce a magnetic field of the same polarity as that produced by the current flowing in signal line SL2*y*. As explained heretofore, the time interval between termination of input pulse *a* and commencement of input pulse *b*, during which remagnetization of the inquiry element is effected between positive and negative magnetic polarization states does not effect an output from register elements E1 or E2, since these registers are controlled by commutator U synchronously with generation of input pulses *a* and *b*, respectively, by synchronous distributor TVZ.

In Example II*b* of FIG. 3, then, closure of switch *s*1 drives the inquiry element into the negative saturation range. Thereupon, the application of input pulse *a* to inquiry element A2*y* effects remagnetization thereof, to the positive saturation range. Following termination of input impulse *a*, the current flowing in signal line SL2*y* effects remagnetization from the positive saturation range to the negative saturation range, and commencement of input pulse *b* drives the inquiry element deeper into the negative saturation range. Under these conditions, register elements E1 and E2 will, respectively produce binary 1 and binary 0 outputs at connection lines *a*1 and *a*2. Evaluator AW' comprises logic circuitry which will then produce binary 1 and binary 0 outputs at Z1 and Z2, indicative of the fact that switch *s*1 is closed.

If switch *s*2 is closed, the resulting current in signal line SL2*y*, will produce an initial magnetization of the inquiry element deeper into the negative saturation range compared to closure of switch *s*1. Under these conditions, neither of input pulses *a* or *b* will produce a magnetic field of sufficient strength to effect the remagnetization of the inquiry element to the positive saturation range. Under these conditions, register elements E1 and E2 will produce binary 0 outputs at connection lines *a*1 and *a*2, and evaluator AW' will thereupon produce binary 0 and binary 1 outputs at output lines Z1 and Z2, respectively. This is indicative of closure of switch *s*2.

A number of variations may be employed to produce indications of other possible signal states. For example, the number of individual pulses comprising each inquiry signal may be increased. Further, individual pulses of different amplitudes may be simultaneously utilized with pulses of the same amplitude, but of opposite polarity. However, changes in state of the inquiry element are evaluated only during the time duration of the individual pulses comprising the inquiry signal; and changes in state of the inquiry element that occur during time intervals between individual pulses, are not evaluated as heretofore explained.

Figure 4:
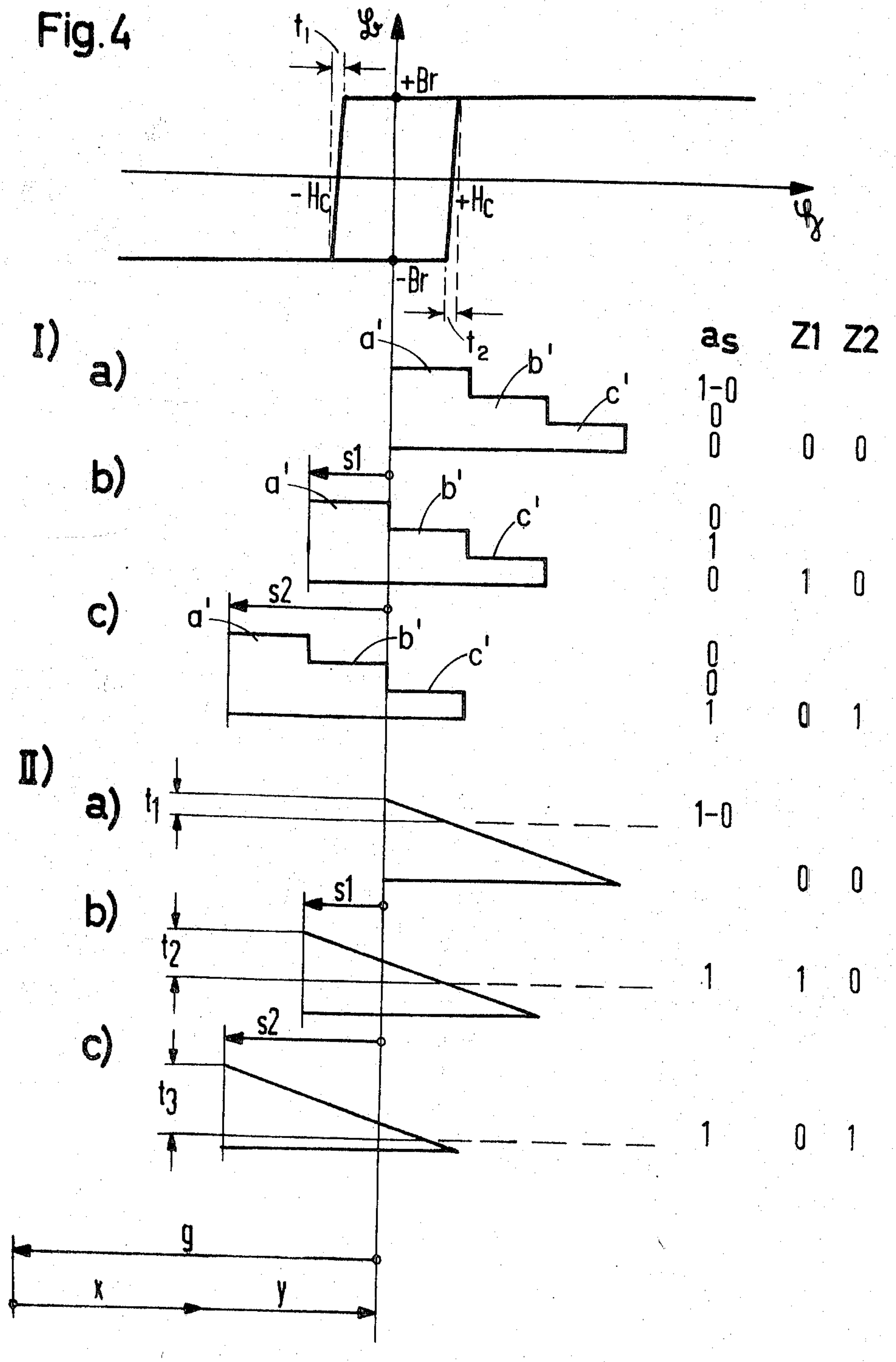
FIG. 4 shows an hysteresis loop similar to FIG. 3, and the magnetic conditions thereof when a stepped inquiry signal (example I) and a sawtooth inquiry signal (example II) is applied thereto.

FIG. 4 illustrates an inquiry element having the same magnetic hysteresis loop illustrated in FIG. 3. However, the inquiry signal comprises a single pulse having a plurality of amplitude levels or a stepped wave. For example, Example I*a* illustrates an inquiry signal comprising individual segments, *a*', *b*' and *c*', successively increasing in amplitude. Thus, each inquiry signal is divided into three evaluation ranges, *a*', *b*' and *c*', corresponding to the three signal states of switches *s*1 and *s*2 to be evaluated. The utilization of a control signal comprising three amplitude levels, assures that the correct evaluation can be made, independent of the initial magnetization state existing at the commencement of the scanning process to determine the state of the signal line.

For example (in the FIG. 4 arrangement) since a time interval does not exist between amplitude levels of the inquiry control signal, a return to a definite predetermined magnetization state does not occur, as it does in the examples illustrated in FIG. 3, wherein input pulses *a* and *b* are separated by a definite time interval, and depending upon the state of the signal line SL2*y*, the inquiry element returns to an initial predetermined magnetization state during that time interval. Utilization of the inquiry signal illustrated in Example I of FIG. 4, takes into account whether the inquiry element is initially in the positive or negative remanent magnetic state.

Depending upon whether the inquiry element is in the positive or negative remanent magnetic state, signal segment *a'* will induce a binary 0 or binary 1 output, respectively, in the output winding of the inquiry element. However, signal segment *a'* will drive the inquiry element into the positive saturation range, since it will produce a positive magnetic field as illustrated in example I*a* of FIG. 4. Then, since signal segments *b'* and *c'* are of greater amplitude than signal segment *a'* and of the same polarity, they will drive the inquiry element deeper into the saturation range, and hence will produce relatively slight currents in the output winding of the inquiry element, since the magnetic flux variation in the saturation range, is slight. Therefore, the output winding of the inquiry element will feed successive binary output signals according to the series 1, 0, 0, or 0, 0, 0, depending upon whether the inquiry element is initially in the negative or positive remanent magnetic polarized state. Either series will be evaluated by evaluator AW'' (not illustrated), to produce binary 0 output Z1 and Z2, which is indicative of the currentless condition of signal lines SL2*y* (switches *s*1 and *s*2 are both open).

Example I*b* of FIG. 4, illustrates the effect of closing switch *s*1 to effect a current in the signal line, such as to initially magnetize the inquiry element to the negative saturation range. Thereupon, signal segment *a'*, will not be sufficient to effect remagnetization of the inquiry element. However, signal segment *b'* will be sufficient to effect remagnetization, of the inquiry element to the positive saturation range, and its corresponding magnetic field will induce relatively high amplitude currents in the output winding of the inquiry element, since the transition range $t_2$ will be traversed. Subsequently, signal segment *c'* will drive the inquiry element deeper into the positive saturation range. Therefore, the register will produce successive outputs as of binary 0, 1, 0, which will be evaluated by evaluator AW' to produce binary outputs of 1 and 0 at output lines Z1 and Z2, respectively. This is indicative of switch *s*1 being closed.

It is seen with reference to Example I'c of FIG. 4, that when switch *s*2 is closed the current flowing in the signal line, will drive the inquiry element into the negative saturation range such that signal segments *a'* and *b'* will not be sufficient to effect positive remagnetization of the inquiry element. However, signal segment *c'* is of sufficient magnitude to effect such remagnetization. Therefore, under these conditions, the inquiry element will produce successive binary outputs as of 0, 0, 1. These will be evaluated by evaluator AW'' which will then produce outputs at Z1 and Z2 equal to binary 0 and binary 1, respectively, which is indicative that switch *s*2 is closed.

If the inquiry signal comprises two signal segments, binary 0 or binary 1 outputs may be produced when both switches are open, or when switch *s*1 is closed, if the inquiry element is initially in the negative saturation range. This would occur during registration of the current induced in the output winding as a result of signal segment *a'* when both switches *s*1 and *s*2 are open, and during registration of the current induced in the output winding of the inquiry element as a result of signal segment *b'* when switch *s*1 is closed. It is seen that addition of a third signal segment *c'* prevents incorrect evaluation of the registrations resulting from these possibilities, since the last two registrations resulting from signal segments *b'* and *c'* are binary 0 and 0, and binary 1 and 0, respectively, when the inquiry element is in states *a* and *b*, respectively (see Example I*a* and I*b* of FIG. 4). Therefore, distinct evaluations are made depending upon the particular state of the inquiry element.

The correct evaluation could also be obtained, if instead of utilizing a third signal segment *c'*, the element were premagnetized such that, in the absence of current in the signal line, an initial magnetic state of predetermined polarization is maintained.

Example II*a* of FIG. 4 illustrates the utilization of a sawtooth wave as the inquiry signal. The inquiry element is then continuously sampled, to determine the time at which magnetic polarization reversal occurs. For example, with reference to Example II*a*, wherein switches *s*1 and *s*2 are both open, it will occur at time $t_1$. However, either a binary 1 or binary 0 may then be induced in the output winding of the inquiry element depending upon whether the inquiry element is initially positively or negatively polarized. Example *b*, which shows the effect of closing switch *s*1, illustrates that at time I t2 a binary 1 is produced; and example *c*, shows that when switch *s*2 is closed, a binary 1 is produced at time $t_3$. Therefore, determination at the time at which a binary 1 is produced by the inquiry element will be evaluated to produce corresponding outputs at Z1 and Z2, indicative of the particular state of the switches.

With reference to graph II*a* of FIG. 4, it is seen that if a binary 0 is produced at time $t_1$, which is indicative of initial magnetization of the inquiry element in the positive saturation range, a binary 0 will be continuously produced at other times when the inquiry element is sampled since the sawtooth wave positively increases in amplitude and drives the inquiry element deeper into the positive saturation range, thereafter. Therefore, aside from the first evaluation (corresponding to signal segment *a'* or time $t_1$) a binary 1 output at the associated register element $A_s$, when related to a specific signal segment with reference to Example I, or to a specific time with reference to Example II, eliminates the necessity of continuing the questioning process for the particular inquiry element. That is, since the inquiry signal applied to the inquiry element successively increases with time, remagnetization can only occur once during a particular individual inquiry process. Therefore, each subsequently effected increase in magnetization, once remagnetization occurs, only drives the inquiry element deeper into the positive saturation range. It is seen, therefore, that by correctly determining the time, or the particular signal segment during which the inquiry element output winding produces a binary 1 output, when either switch *s*1 or *s*2 is closed, the particular state of signal line SL2*y*can be evaluated and the process can be discontinued. Therefore, this provides a substantial savings in time during which scanning of an individual inquiry element is necessary. The amount of time saved depends, of course, on the particular state of the signal line. With respect to the utilization of a plurality of signal segments as illustrated in Example I of FIG. 4, the individual evaluation signals are derived from the output signals from the inquiry element induced at the beginning of the individual signal segments. This provides a further savings in time during which the inquiry element must be questioned.

Figure 5:
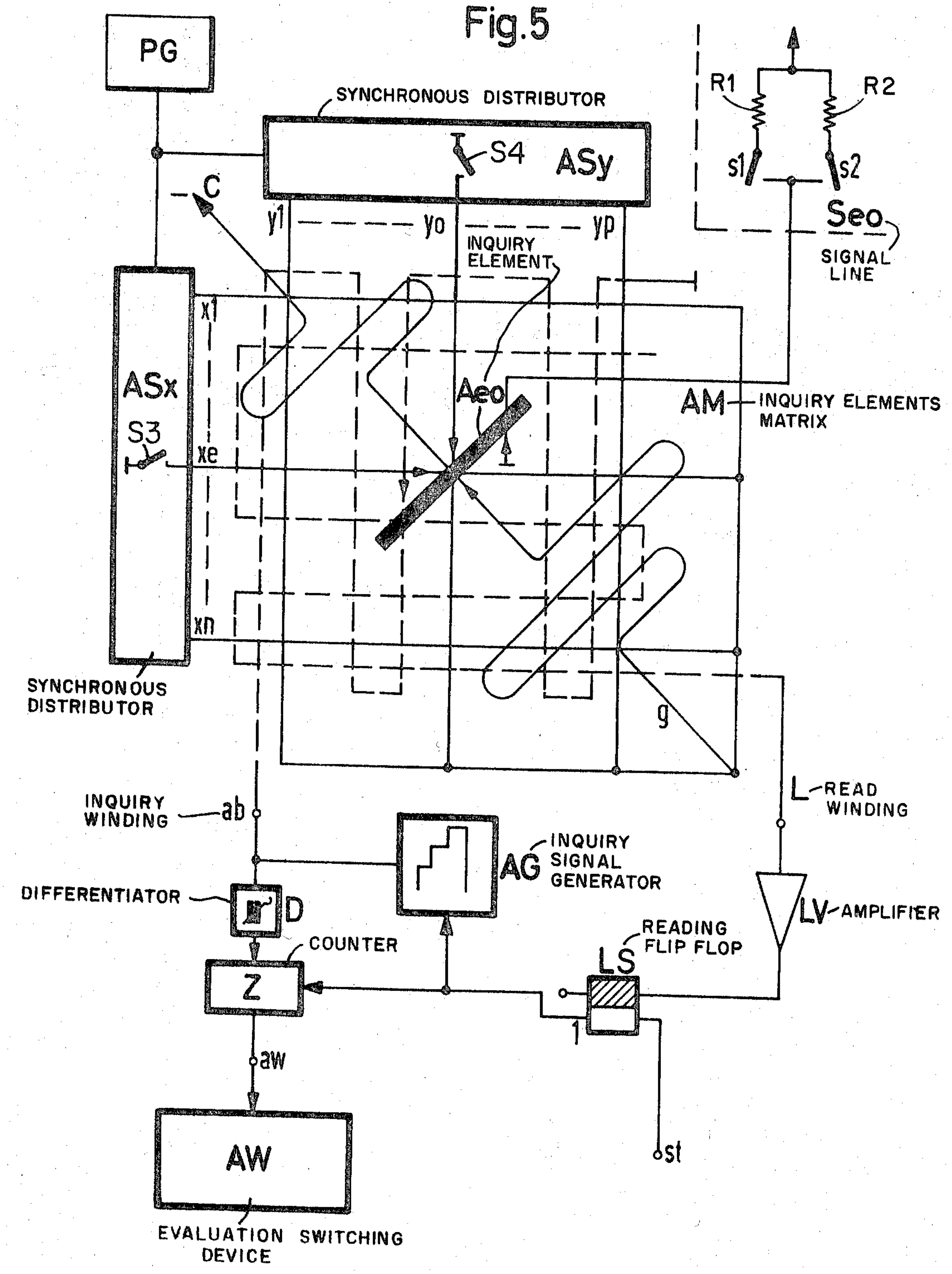
FIG. 5 is an electrical schematic diagram of a preferred embodiment of the invention, which illustrates the matrix comprising the inquiry elements, connected to the supervisory and evaluation apparatus and the inquiry signal generating apparatus.

FIG. 5 illustrates another embodiment of the invention, wherein the selection of *g*. inquiry element of the signal line to be questioned, and the actual questioning of the inquiry element, occurs in successive steps. The individual inquiry element is selected by synchronous actuation of synchronous distributors AS*x* and AS*y*. For example, FIG. 5 illustrates the selection of inquiry element A*eo*,by synchronously closing switches *s*3 and *s*4 of AS*x* and AS*y*, respectively. This completes the circuits from synchronous distributors AS*x* and AS*y*, through connection lines *xe* and *yo*, respectively, to inquiry element A*eo* through common counter magnetization line *g*, to terminal—C. Therefore, equal and oppositely directed currents flow through the control winding of inquiry element A*eo*, since the currents flowing in lines *xe* and *yo* flow oppositely to the combined currents flowing in line g. This is illustrated in FIG. 4, Example III, wherein it is shown that the magnetic fields *x* and *y* effected by the currents flowing in connection lines *xe* and *yo*. respectively, are equal and of same polarity (that is, positive) and are oppositely directed to the magnetic field effected by the current flowing in the counter magnetization line $g$ (wherein, $g$ equals $-x-y$ ). It is therefore seen that the combined or total magnetic field developed by inquiry element Aeo under these conditions, equals zero, due to the inquiry signals fed over lines $xe$ and $yo$ to its control winding. Simultaneously, either the current flowing in counter magnetization line $g$, or the current flowing in counter magnetization line $g$ and the current flowing in column connection line $yo$ or in row connection line $xe$, flows through the control windings of the inquiry elements not being questioned and magnetically polarizes these inquiry elements into either the positive or negative saturation range. Therefore, the inquiry signal, which is fed to the common control winding of the inquiry elements comprising matrix AM over line $ab$, does not appreciably effect the inquiry elements of the signal lines not being questioned since the magnetic flux variations it produces therein, is practically ineffective since they occur within one of the saturation ranges. Therefore, the correct indication of the state or condition of the selected inquiry element Aeo being questioned, is obtained.

Thus, it is seen that the circuit illustrated in FIG. 5, provides that at the beginning of the questioning process for the selected inquiry element, the selected inquiry element is in a predetermined magnetic polarized state (—Br). Then, assuming that its associated signal line Seo is in the state wherein switches $s1$ and $s2$ are both open, a binary 1 reading will be obtained when the first evaluation signal segment $a'$ with reference to Example Ia of FIG. 4 is fed to inquiry element Aeo since transition zone $t_2$ will be traversed. This will eliminate the necessity for proceeding further with the inquiry process, resulting in a substantial savings in time.

The synchronous distributors AS$x$ and AS$y$ comprise switch means $s3$ and $s4$ which are selectively and synchronously actuable to complete circuits to the desired inquiry element. For example, closure of switches $s3$ and $s4$ as illustrated in FIG. 5, will enable questioning of signal line Seo through inquiry element Aeo. Synchronous distributor AS$x$ is connectable to a plurality of parallel lines output row connection lines, $x1$, $xe$, $xn$, and synchronous distributor AS$y$ is connectable to a plurality of parallel column connection lines $y1$, $yo$, and $yp$. The number of row and column connection lines can be varied, depending upon the number of inquiry elements to be questioned.

The arrangement illustrated in FIG. 5, provides a plurality of inquiry elements, successively and individually connected to an associated row and column connection line. Thus, nine inquiry elements are utilized in this arrangement; however, for clarity, only inquiry element Aeo is illustrated. Further, counter magnetization connection line $g$ is connected in series with the row and column connection lines, and the signals flowing therein are fed back to the inquiry element being questioned in such a manner as to effect an opposing and equal magnetic field compared to the magnetic fields developed by the currents flowing in the row and column connection lines. The common counter magnetization connection line $g$ is connected to all inquiry elements of matrix AM; this is symbolically illustrated in FIG. 5.

As explained heretofore, the address signal $xy$ drives all of the nonselected inquiry elements into magnetic saturation, and simultaneously effects initial magnetization of the inquiry element being questioned to the negative remanent magnetic state, —BR. Therefore, the inquiry signals which are then fed over inquiry winding $ab$ through the inquiry elements, and particularly to the inquiry element of the signal line being questioned, are precluded from inducing distortions or incorrect indications in the nonselected inquiry elements since they are deep in the negative saturation range. Thereby, they do not effect the output reading obtained from the output winding of inquiry element Aeo, being questioned.

Reading flip-flop LS is triggered by control signals fed over line $st$, causing it to emit a control pulse, that simultaneously activates inquiry signal generator AG, and resets counter Z to the zero position. The purpose of counter Z, is to count the inquiry signal segments to determine when a binary 1 output is produced by the inquiry element of the signal line being questioned, this being indicative of a magnetic polarization reversal thereof, and hence, of the state of signal line Seo. Counter Z is actuated by control pulses derived by differentiator D, which serves to differentiate the leading edges of the inquiry signal segments.

When the magnetic polarization of the inquiry element Aeo is reversed in response to a segment of the inquiry signal, the maximum flux variation range $t_2$ will be crossed, and the common output or read winding L of the inquiry elements will have a relatively large amplitude current pulse induced therein. This will be amplified by amplifier LV, and will reset reading flip-flop state LS to the rest position, simultaneously deenergizing the inquiry signal generator AG, and counter Z. Counter Z and particularly the number of individual inquiry signals counted, is then evaluated by evaluation switching device AW, to determine the condition of signal line Seo.

For example, with reference to FIG. 4, Example I, if a binary 1 output (indicative of a large amplitude variation and thus of a magnetization polarization reversal of the inquiry element Aeo) is read in response to the first inquiry signal segment $a'$, counter Z will count to 1, which is indicative of both switches $s1$ and $s2$ being opened. If a binary 1 output is produced by the inquiry element in response to the second signal segment, $b'$, counter Z will stop counting at integer 2, which is indicative of switch $s1$ being closed. Finally, if a binary 1 output is produced by inquiry element Aeo in response to the third control signal segment, $c'$, counter Z will count to integer 3, and this will be evaluated by evaluator AW as indicative of switch $s2$ being closed.

Figure 6:
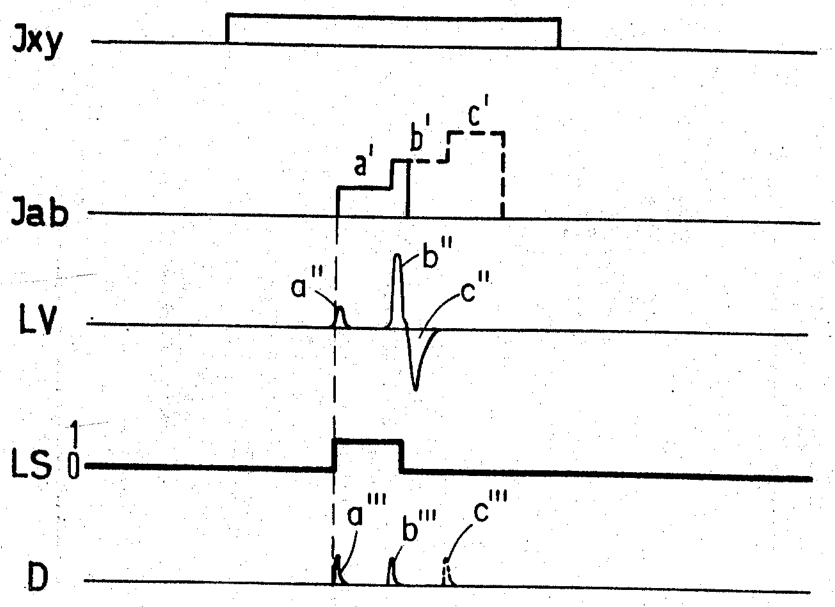
FIG. 6 is a series of five related graphs, illustrating the signals present in various parts of the circuit illustrated in FIG. 5 at selected times.

FIG. 6 is illustrative of the operation of the inquiry arrangement illustrated in FIG. 5. Thus, closure of the switches of synchronous distributors AS$x$ and AS$y$, effects completion of the address circuit, which results in feeding current $xy$ to the selected inquiry element, to set the inquiry element to the remanent magnetic state —BR. The inquiry signal AB, comprising successive pulses of increasing amplitude $a'$, $b'$, $c'$, is then fed to the inquiry element, at a predetermined time thereafter to ensure that correct readings are obtained, since there is a time interval loss involved in switching to the selected inquiry element. Thus, the inquiry or questioning process is isolated from this initial reaction time.

Assuming that switch $s1$ of signal line Seo is closed, the leading edge of signal segment $a'$ will cause only a slight amplitude current to be induced in the read winding L, because as explained heretofore, the magnetic change or variation produced thereby is effective within the saturation range, thereby causing small currents to be induced in the read winding. However, when signal segment $b'$ is fed to inquiry line $ab$, a magnetic polarization reversal across transition zone $t_2$ is effected, causing read amplifier LV to respond thereto, and to produce an output pulse that deactuates reading flip-flop LS. Therefore, counter Z will have read two integers, and this will be evaluated by evaluator AW to indicate that switch $s1$ is closed.

As heretofore explained, reading flip-flop LS deactivates the inquiry signal generator AG, when amplifier LV produces a binary 1 output. This causes a corresponding and relatively large magnetic flux variation from a positive magnetic field to zero magnetic field, causing a negative pulse to be generated in read winding L. However, the negative distortion pulse $c''$ induced in the read winding is not effective to produce an inaccurate reading, since it occurs after reading flip-flop LS is reset as a result of signal segment $b'$ effecting a magnetization polarization reversal. Further, it is of opposite polarity to that necessary to reactivate reading flip-flop LS.

Graph D of FIG. 6, illustrates the differentiation of the leading edge segments of the inquiry signal, which are fed to counter Z. The dotted lines illustrated in Graphs $ab$, and D illustrate that signal segment $c'$ will be fed to inquiry line $ab$ if remagnetization does not occur in response to signal segment $b'$. This, of course, would be indicative of switch $s2$ being closed. The address signal $xy$ is also illustrated, and it is seen that the inquiry signal *ab* is fed to the control winding at a time spaced interval thereafter. Graph LS indicates activation of reading flip-flop LS in response to signal *st*, to activate inquiry signal generator AG and counter Z. Graph LV shows the relative signals *a''* and *b''* induced in read winding L in response to signal segments *a'* and *b'*, respectively.

Thus, signal segment *a'* causes a relatively small signal *a''* to be induced (a binary 0 ), since the associated magnetic flux variation occurs within the saturation range. However, signal segment *b'* causes a relatively large signal *b''* to be induced (a binary 1 ) since the associated magnetic flux variations occurs across the transition zone $t_2$. This deactivates reading flip-flop LS as heretofore explained, and hence inquiry signal generator AG and counter Z, the latter having counted two pulses (*a'* and *b'* ). This is indicative of switch *s*1 being open. Pulse *c'* is then not generated.

It is therefore seen that the FIG. 5 embodiment of the invention, substantially decreases the effect of any distortion signals introduced. These, of course, are effective when the inquiry element is initially energized by the inquiry signal, and is then subsequently deenergized, since relatively large changes in magnetic flux densities then occur. Therefore, it is seen that the two distortion pulses introduced are of opposite polarity and follow each other in relatively short time succession. However, since the inquiry element is remagnetized only once between the occurrence of the two distortion pulses, the energy transmitted to the read winding L is limited, resulting in very little distortion. Further, because of the double distortion pulse character, the frequency signals that have the greatest effect on magnetic flux variations, comprise mostly harmonics of frequencies lying outside the speaking band of frequencies, and hence have substantially little effect especially when questioning telephone communication lines, for example.

Figure 7:
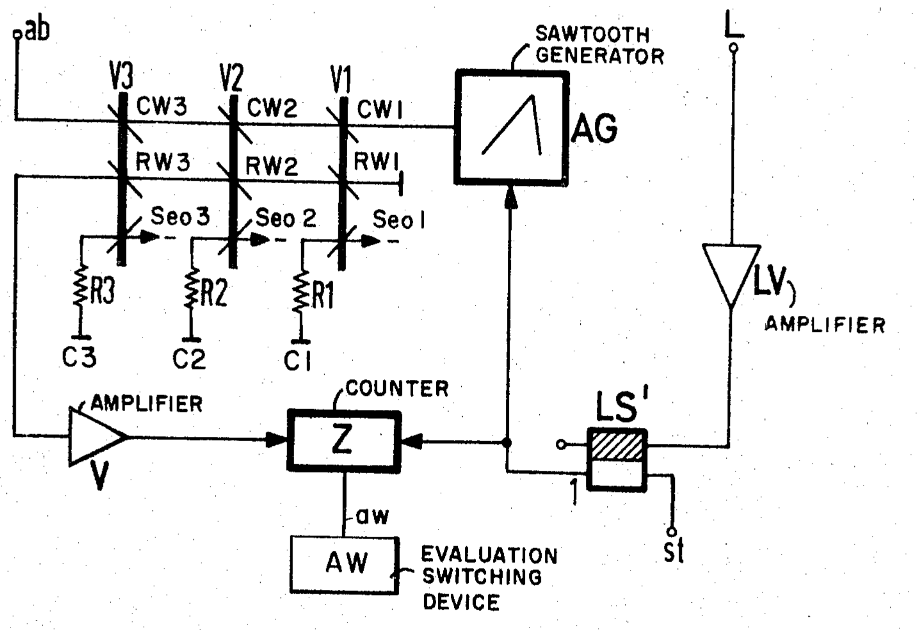
FIG. 7 is an electrical schematic diagram of a sawtooth wave generator, and a time evaluation means which may be utilized with the matrix and supervisory control circuits illustrated in FIG. 5, to determine the time at which a predetermined magnetization change occurs in the inquiry element associated with the signal line being questioned.

FIG. 7 illustrates a preferred embodiment of the invention which provides countersynchronizing pulses to counter Z, when a sawtooth wave is utilized as the inquiry signal. Comparators comprising three additional inquiry elements, VI, V2, and V3, similar to the inquiry elements being questioned, are utilized. The control windings, CW, CW2, and CW3 of the three inquiry elements, are connected in the connection line *ab*, and are thus fed by the sawtooth wave generated by generator AG. The three comparators V1, V2, and V3, are respectively fed over resistors R1, R2, and R3, by currents which initially magnetize the comparators to the magnetic threshold values of inquiry element A*eo* resulting from the three possible signaling states of signal line S*eo*. These are, of course, the first state in which both switches *s*1 and *s*2 are open, the second state in which switch *s*1 is closed, and the third state in which *s*2 is closed. When the actual threshold value of the inquiry element of the signal line being questioned is reached as a result of the increasing sawtooth inquiry signal, remagnetization of the respective comparator element occurs, and a relatively large amplitude current is induced in the associated read winding. This in turn is amplified by amplifier LV, which then causes a binary 1 pulse to be fed to counter Z, to effect a 1 integer count. It is, therefore, seen that the comparator elements V1, V2, V3, will successively produce output pulses in read windings RW1, RW2, RW3, as the sawtooth wave applied to control windings CW1, CW2, CW3, respectively, progresses between its minimum and maximum amplitude values. Thus, counter Z will count progressively from 1 to 3 as the sawtooth inquiry signal reaches the three threshold values, respectively. Termination of the counting process will occur when reading flip-flop LS deactivates sawtooth generator AG and counter Z when remagnetization of inquiry element A*eo* of signal line S*eo* being questioned occurs. This occurs when a binary 1 pulse is induced in read winding L, and is fed to reading flip-flop LS. Then, the number of pulses that have been counted by counter Z will be evaluated by AW to determine the state of the inquiry element associated with the signal line being questioned.

Preferably, the magnetic threshhold preenergization signals C1, C2, C3 respectively applied to R1, R2, R3 are provided by a common source of operational signals, which are also applied to the signal lines. This offers the advantage that fluctuations in the operational potential of the signal lines are tracked by corresponding fluctuations in the threshold preenergization signals applied to the comparators. Therefore, an incorrect evaluation of the particular state of the signal lines being questioned, will not occur.

It is understood that the inquiry signals illustrated in the various embodiments of the invention have been described for purposes of illustration of the invention. Other inquiry signals may be substituted without departing from the teachings of the invention.

We claim:

1. A system for the supervision of signal lines having different conditions corresponding to different signals thereon, including inquiry elements of one of the ferromagnetic and ferroelectric type, which are individually assigned to the signal lines and possess a distinct saturation characteristic, means for supplying to the inquiry elements periodic inquiry impulses which effect different flux changes in the inquiry elements, depending on the instantaneous signal condition of the signal line, and means for evaluating the flux changes in the inquiry elements, characterized by the fact that:

said supplying means supplies inquiry impulses each of which has at least two successive partial portions distinguished from each other by having at least one of different polarities and different amplitudes; and said evaluating means includes first means (V.../AR or LV/LS) responsive to the flux changes in the inquiry elements occuring during each inquiry impulse and second means (AW or Z/AW) responsive to the output of said first means for providing an indication (Z1, Z2) of the signal condition of the signal line associated with the inquiry element which exhibited the flux changes.

2. The apparatus of claim 1 in which said inquiry elements are arranged in column and row form to make up a matrix, and means (TVZ; AS*x*, AS*y*) for scanning said matrix to make said inquiry impulses effective to provide said flux changes.

3. The apparatus of claim 2 in which said scanning means includes selection means TVZ connected to said supplying means and to the matrix to selectively supply the inquiry impulses to a selected inquiry element.

4. The apparatus of claim 1 in which said supplying means generates for each inquiry impulse a sawtooth wave of successively increasing amplitude.

5. The apparatus of claim 4 in which said evaluating means includes counter means Z connected to the inquiry elements (FIG. 5, A*eo*) and said supplying means AG to determine the time at which a change in operating state from the initial operating state occurs in response to the inquiry signal, and to produce a time indication signal L indicative thereof, connection means *aw* connected to the time analysis means Z to feed the time indication signal to said second means AW, said second means being operable to evaluate the time indication signal to provide an indication z1,z2 of the signal condition of the associated signal line S*eo*.

6. The apparatus of claim 4 in which said time analysis means comprises comparator means (VI, V2, V3) connected to said supplying means;

a source of comparator signals (C1, C2, C3) connected to the comparator means to feed comparison signals thereto corresponding to said possible different signal amplitude conditions of the signal lines;

the comparator means having reading means (RW1, RW2, RW3) which provide read signals when the inquiry signals are equal to a comparison signal;

counter means Z connected to the comparator means to count the read signals; and switch means LS' connected to the counter means Z and to the selected inquiry element to deactivate the counter means Z and the source of inquiry signals when a change between energy saturated operating states occurs.

7. The apparatus of claim 6 in which the comparator means comprises at least three additional inquiry elements (V1, V2, V3) connected to said supplying means AG.

8. The apparatus of claim 7 further comprising a common source of operating signals connected to the signal lines, and to corresponding inquiry elements of the comparator means to provide the comparator signals (C1, C2, C3).

9. The apparatus of claim 1 wherein said supplying means generates a plurality of time spaced pulses (FIG. 2, Example I*a; a, b* ) having the same electrical polarity and different amplitudes.

10. The apparatus of claim 1 wherein said supplying means generates a plurality of time spaced pulses (FIG. 2, Example II*a; a , b* ) of equal amplitude and opposite polarity.

11. The apparatus of claim 1 in which said supplying means generates a stepped wave (*a'*, *b'*, *c'*) comprising at least three successively increasing amplitude levels.

12. The apparatus of claim 1 wherein the plurality of inquiry elements comprise ferromagnetic inquiry elements.

13. The apparatus of claim 1 wherein the plurality of inquiry elements comprise ferroelectric inquiry elements.

14. The apparatus of claim 1 wherein the inquiry elements further comprise a common input means *ab* connected between said supplying means AG and the inquiry elements:

a common output means L connected to the inquiry elements, responsive to changes in operating state of the inquiry elements to produce an indicating signal;

evaluating means being connected to the common output means to evaluate said indicating signal; and biasing means *g* connected to the inquiry elements to bias the selected inquiry element to a predetermined energy reference value, and the remaining inquiry elements to one of at least two energy saturated operating states so that changes from the initial operating states are not effected in the remaining inquiry elements by the inquiry signals.

15. The apparatus of claim 14 including a source of address signals *xy* selectively connected to the plurality of row and column connection lines (*xe, yo* ) to effect selection of the inquiry element A*e*. to be supervised, initial wherein the biasing means comprises a counter magnetization line *g* connected to the selected inquiry element and its associated row and column connection lines (*xe, yo* ) to feed the address signals to the selected inquiry element in opposite polarity relative to the row and column connection lines.